United States Patent [19]

Sammons

[11] Patent Number: 4,986,152
[45] Date of Patent: Jan. 22, 1991

[54] CURVE CUTTING METHOD AND APPARATUS

[76] Inventor: Marvin L. Sammons, 6779 Fargo Rd., Avoca, Mich. 48006

[21] Appl. No.: 530,211

[22] Filed: May 30, 1990

[51] Int. Cl.[5] .......................... B26D 1/00; B26D 7/06; B27C 5/00
[52] U.S. Cl. ...................................... 83/13; 83/410.9; 83/412; 83/427; 144/134 R; 144/137; 144/154; 144/372
[58] Field of Search ................ 144/1 R, 134 R, 137, 144/139, 154, 372; 83/410, 410.9, 412, 427

[56] References Cited

U.S. PATENT DOCUMENTS

| | | | |
|---|---|---|---|
| 4,567,927 | 2/1986 | Plamann | 144/154 |
| 4,603,716 | 8/1986 | Rhodes | 144/154 |
| 4,825,920 | 5/1989 | Evitts | 144/137 |

*Primary Examiner*—W. Donald Bray
*Attorney, Agent, or Firm*—Leydig, Voit & Mayer

[57] ABSTRACT

A fixture for use with a cutting tool, such as a saw or sander, and adapted to cut perfect circles in a workpiece. The fixture has a base which is adapted to be positioned on a work table in a predetermined relationship with respect to the cutting tool. A pivot arm is supported on the base at a first pivot point such that the pivot arm pivots on the base toward or away from the cutting tool in an arc centered at the first pivot point. A second pivot point is formed on the pivot arm and is adapted to provide a center point about which the workpiece is rotated. Stop means defines a working position for the pivot arm in which the workpiece center and the cutting tool are displaced by a distance corresponding to the radius to be cut. The operator pivots the pivot arm toward the stop and rotates the workpiece about the second pivot point so as to bring the cutting tool into the workpiece to the defined radius, following which continued rotation of the workpiece about the second pivot results in cutting of a perfect circle.

19 Claims, 7 Drawing Sheets

CURVE CUTTING METHOD AND APPARATUS

FIELD OF THE INVENTION

This invention relates to cutting tool fixtures, such as fixtures for woodworking tools, and more particularly to such fixtures adapted for cutting of predetermined curved shapes.

BACKGROUND OF THE INVENTION

The art is replete with various fixtures adapted for one or more tools and arranged for cutting of circles or other arcuate shapes. While it is difficult to categorize all such fixtures, it is believed accurate to state that they suffer from a one or more of the following deficiencies, with individual ones of the deficiencies being more or less prominent in any particular one of the prior art configurations, (1) limited flexibility in the configuration of the workpiece in that many require the workpiece to be precut to the approximate size or notched to about the desired radius before circle cutting can begin; (2) unwanted complexibility in setting the device to cut a particular circle or curve; (3) the inability to use the device with a variety of tools such as saws and sanders; (4) complexity which clutters the area of the workpiece and its support to prevent the desired ready access to the workpiece either by manual intervention or by means of automatic equipment for controlling the workpiece; and (5) operational complexity in that if a fairly rigorous protocol is not followed it is difficult to generate the desired circles or curves, in other words, a significant lack of ease of operation which results in a high reject rate.

It would be desirable to provide a fixture for cutting circles or other defined curves which is readily adaptable to the home workshop and at the same time sufficiently reliable and accurate to provide the necessary robustness to function in a commercial workshop or industrial environment. It is not seen that a fixture is available which provides both the simplicity and economy affording ease of use and affordability to the hobby workshop as well as the functional integrity which would allow repeated use of the device in a commercial environment.

SUMMARY OF THE INVENTION

In view of the foregoing, it is a general aim of the present invention to provide a fixture for a cutting tool which can be adapted to various types of cutting tools and which is capable of simply and reliably cutting perfect circles in various types of workpieces.

A primary object of the present invention is to provide a fixture for use with a cutting tool which can be used to cut a perfect circle in a workpiece of arbitrary shape, with the resulting circle being readily and reliably cut in a substantially foolproof manner to minimize cleanup machining or wasted improperly cut parts.

A more specific object of the invention is to provide a fixture for use with a cutting tool which can cut perfect circles or other curves in a workpiece, cut which does not require the workpiece to be precut to approximate size or notched to approximate radius before commencing the cut.

It is another object of the present invention to provide a fixture which is multi-functional in that it can utilize various cutting tools for cutting of circles, the tools including jigsaws, band saws, disc sanders and belt sanders, and utilizing the same principle of controlling the workpiece when used with the various tools.

It is a related object to provide such a fixture which is simple and inexpensive, and is thus easily adapted for use in the home workshop, requiring little specialized skill or knowledge on the part of the user in order to cut a perfect circle.

According to one aspect of the invention, it is an object to provide a cutting tool which although simple to use in its basic embodiment, makes provision for sophisticated auxiliary equipment capable of precisely controlling the cutting operation.

It is a feature of the invention that a pivot arm is used to carry a workpiece, the pivot arm being fixed at a pivot point at one end, and having the other end adapted for pivoting at the cutting tool. The pivot arm carries a second pivot point on which the workpiece is mounted for rotation. Pivoting of the pivot arm toward the cutting tool, with concurrent rotation of the workpiece about the second pivot point is adapted to bring the workpiece into the cutting tool to the predetermined radius without substantially binding of the cutting tool or damage to the workpiece.

Additional features of the fixture include base slide means for positioning the pivot point and a pivot arm stop, and pivot arm slide means, all adapted for relative adjustability of the workpiece with respect to the cutting tool, and all adapted to set the predetermined radius for the circle to be cut and to allow the presentation of the workpiece to the cutting tool to allow the cutting tool to penetrate the workpiece to the predetermined radius without binding.

According to certain embodiments of the invention, auxiliary features include manually driven or motor driven drive means (a) capable of controlling the position of the pivot arm in its movement toward the pivot arm stop, and (b) capable of rotating the workpiece about its pivot point, so as to provide precise control of both primary aspects of workpiece movement as the workpiece engages the cutting tool.

Other objects and advantages will become apparent from the following detailed description when taken in conjunction with the drawings, in which:

While the invention will be described in connection with certain preferred embodiments, there is no intent to limit it to those embodiments. On the contrary, the intent is to cover all alternatives, modifications and equivalents included within the spirit and scope of the invention as defined by the appended claims.

DETAILED DESCRIPTION OF THE PREFERRED EMBODIMENTS

Figure 1:
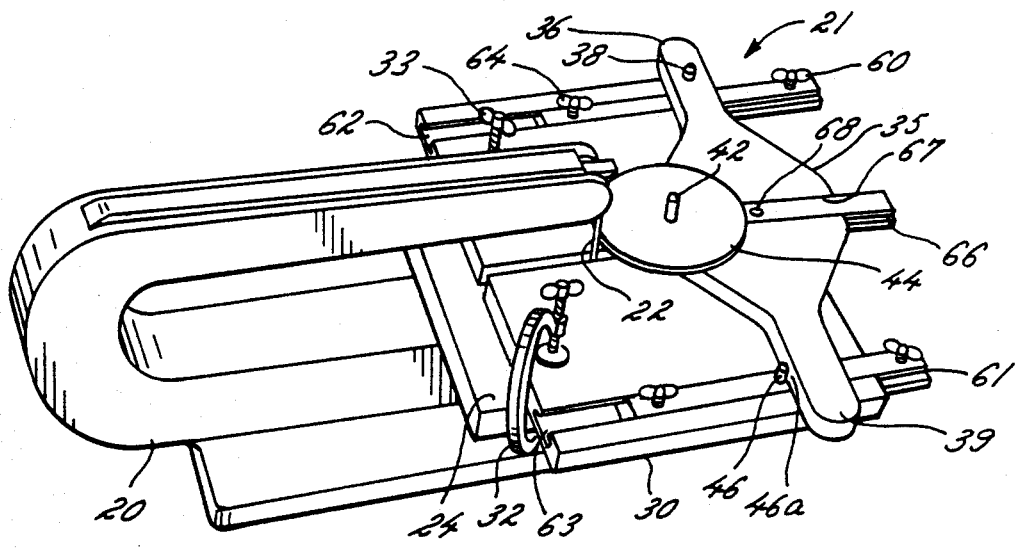
FIG. 1 is a perspective drawing illustrating a power driven jigsaw associated with a circle cutting fixture exemplifying the present invention.

Turning now to the drawings, FIG. 1 shows a power driven tool in the form of a jigsaw 20 associated with a circle cutting fixture 21 exemplifying the present invention. As will become more apparent, the jigsaw 20 is merely exemplary of the types of power tools with which the fixture 21 can be used. The exemplary jigsaw 20 includes a cutting tool 22 in the form of a jigsaw blade, and a worktable 24 adapted to support a workpiece when presented to the cutting tool 22. The various mechanical features of the jigsaw 20, including the base, the blade mounting mechanism, the motorized drive for reciprocating the blade, and the like, will be familiar to those skilled in the art; since their particular configuration is not important to the practice of the present invention, they will not be further described here.

In carrying out the invention, the fixture 21 has a base 30 adapted for mounting in a predetermined relationship with respect to the cutting tool 22 of the power driven tool 20. Thus, in the illustrated embodiment, the base 30 has a planar lower surface 31 adapted to rest on the planar upper surface of the jigsaw base 24. Certain configurations of jigsaw have a locating slot or the like, and it is sometimes desirable to provide the base 30 with a depending tongue (such as an extended edge of an L-shaped structural bracket) for engagement in the slot. For purposes of the illustration, however, the base 31 is shown as planar and resting on the worktable 24. Means are provided for securely affixing the base 30 to the worktable, in the illustrated embodiment being shown as a pair of conventional C-clamps 32, 33. Other forms of attachment means can be used if desired. In instances where it is desirable to permanently associate the fixture 21 with a particular tool, more permanent mounting means, such as a simple bolted or welded connection, can be utilized.

The FIG. 1 embodiment includes a number of adjustment mechanisms adapted to make the fixture 21 readily adaptable for use for a variety of tasks. However, in its simplest embodiment, the fixture 21 need include only a pivot arm, a pivot point for supporting the arm with respect to the base, a stop for establishing a working position for the pivot arm, and a workpiece pivot point on the pivot arm about which the workpiece is adapted to rotate for cutting of the circle. Those basic functional elements will first be described in connection with FIGS. 1 and 2, in order to provide an understanding of the functional interrelationship of those elements, before turning to a description of the additional adjustment mechanisms which render the fixture more readily adapted to multiple uses.

Thus, turning again to FIGS. 1 and 2, it is seen that the base 30 supports a pivot arm 35 on the surface thereof. A fixed end 36 of the pivot arm is secured to the base 30 by means of a pivot 38, such that the non-fixed end 39 of the pivot arm is free to be advanced toward or away from the cutting tool 22. (The end 36 is said to be "fixed" in that it does not translate, but has a position fixed with respect to the base by means of the pivot during any given rotation of the pivot arm.) The pivot 38 can be arranged in any desirable fashion, but for purposes of simplicity it is preferable to arrange an upstanding pin 40 secured to the base 30, and a closely fitting aperture 41 in the fixed end 36 of the pivot arm. Thus, the pivot arm is adapted to pivot about the point 38 when the free end 39 of the pivot arm is manually manipulated.

Figure 2:
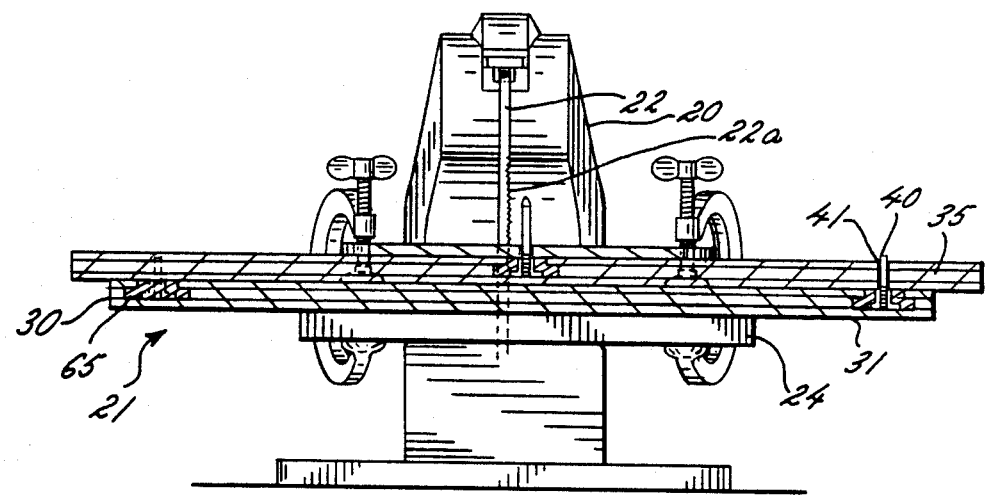
FIG. 2 is an elevational view of the system of FIG. 1 illustrating the fixture base carrying the pivot arm which in turn carries the workpiece engaged by the cutting tool.

In practicing the invention, a second pivot 42 is arranged on the pivot arm, and the pivot point 42 serves as a center about which a workpiece 44 is rotated during cutting of a circle (or other curve). Thus, with the pivot arm positioned in the working position shown in FIG. 1, rotation of the workpiece 44 about the center defined by pivot point 42 presents the workpiece to the cutting tool 22 to allow cutting of a perfect circle from the workpiece. It is seen in FIG. 2 that the blade 22 is positioned with its cutting edge 22a generally tangent to the circle to be cut, such that the workpiece when in the position shown in FIG. 1 can be rotated about the center point 42 to cause cutting of a circle defined by the blade-tangent without fear or binding the blade. It will be recognized by those skilled in the art that when the blade binds in the workpiece, it can tend to bow or move off the desired line of cut, resulting in cuts in the workpiece which are positioned otherwise than on the desired periphery of the circle. It is such binding and the like which tend to cause imperfect circles to be cut, resulting in the wastage which the present invention is intended to avoid. Thus, for as far as the present description has proceeded, it will be appreciated that when the workpiece 44 is brought to the working position illustrated in FIG. 1, cutting of the circle can continue around the remainder of the periphery without danger of binding the blade or marring the workpiece.

Before turning to the elements which cause the workpiece to be brought to the working position of FIG. 1 without marring or damaging the workpiece, attention will first be directed to the stop means which establishes the radius of the circle to be cut, and maintains that radius during cutting of the circle. To that end, the free end 39 of the pivot arm 35 is adapted to engage stop means 46 associated with the base 30. As will become more apparent, the workpiece is positioned on the center pivot 42 when the free end 39 of the pivot arm is displaced from the working position (moved counter-clockwise as illustrated in FIG. 1), then a cut is convinced by pivoting the pivot arm 35 toward the working position until the free end 39 engages the stop means 46 to define the working position and maintain the desired radius. Continued rotation of the workpiece 44 then produces a circle cut to the radius defined by the thus-positioned elements. Preferably, the stop means 46 includes a latch, so that when the pivot arm is brought to the working position, it is firmly latched there, allowing the operator to free his left hand and thus use both hands for control of the workpiece, while being assured that the pivot arm will not back away from the tool to produce a defective cut. The locking means is suggested by dashed element 46a arranged near the free end 39 of the pivot arm 35 and positioned to engage the stop pin 46 to lock the pin in position during a cut, following which the latch can be released before commencing the next cut.

In summary, it is seen that the major functional elements of the fixture according to the present invention are a base 30 which is fixed in a predetermined relationship with respect to the cutting tool 22, a pivot arm 35 which has a predetermined relationship with respect to the base 30, a first pivot point 38 which partly establishes that relationship in fixing one end of the arm with respect to the base, a stop means 46 which establishes a working position for the pivot arm 35, and a second pivot point 42 on the pivot arm about which the workpiece 44 is rotated to complete the circular cut.

Figure 3:
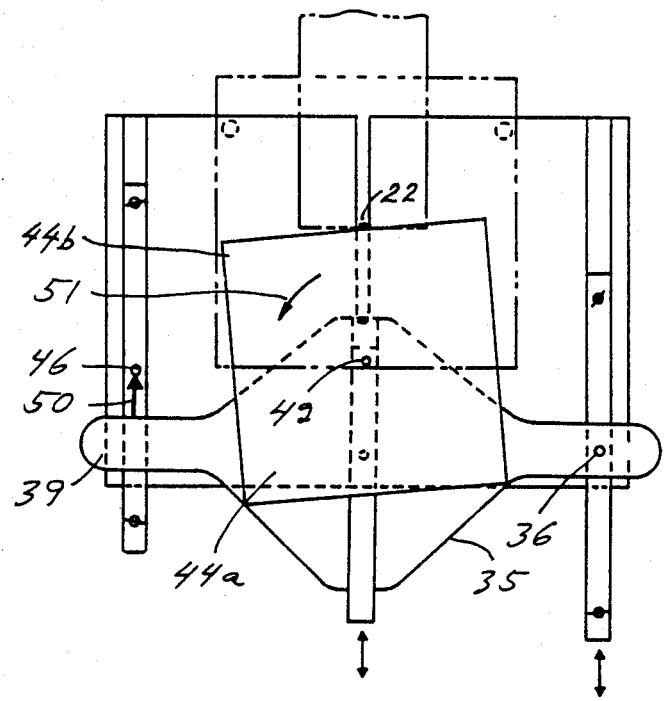
FIG. 3 is a plan view of the apparatus of FIG. 1 illustrating the pivoting of the pivot arm and rotation of the workpiece adapted to bring the workpiece into engagement with the cutting tool.
Figure 4:
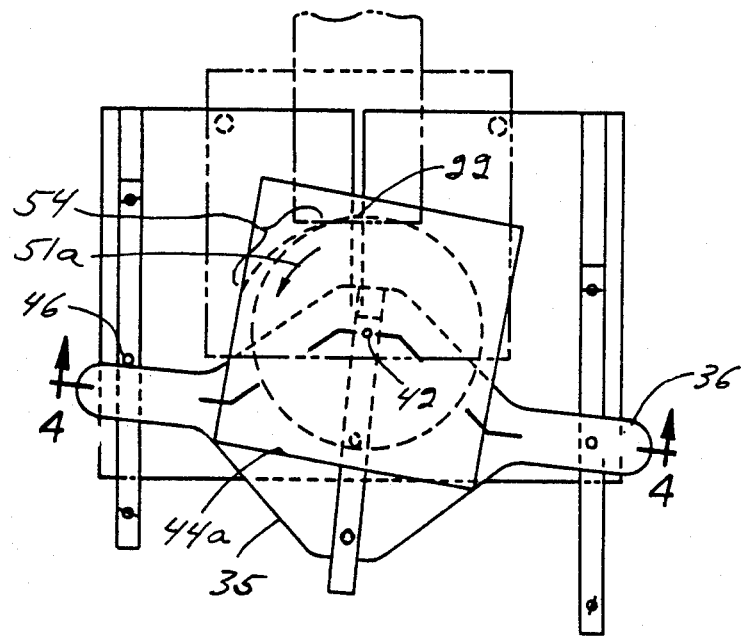
FIG. 4 is a view similar to FIG. 2 showing the pivot arm in the working position, and continued rotation of the workpiece about the pivot point to cut a perfect circle.

The manner in which those elements function to allow the blade to penetrate the workpiece for the initial cut until the working position is assumed will now be described in connection with FIGS. 3 and 4. It is seen in FIG. 3 that a square workpiece 44a is mounted on the pivot arm 35 with the center pivot 42 penetrating a hole formed near the center of the workpiece. It will become apparent that the hole need not be in the precise center of the workpiece because of the features provided by the circle cutting fixture of the present invention.

It is seen in the FIG. 3 illustration that the cutting tool 22 has not yet entered the workpiece, being positioned near one of its edges. The fixed end 36 of the pivot arm 35 is positioned such that, with the free end 39 somewhat withdrawn from the stop pin 46, the edge of the workpiece is almost in contact with the blade. Arrow 50 indicates that the operator will then manually advance the free end 39 of the pivot arm 35 toward the working position, while arrow 51 indicates that the operator is concurrently rotating the workpiece in a clockwise direction on its supporting pivot point 42. Thus, the blade 22 enters the workpiece almost on a tangent even though there is a substantial distance between the edge 44b of the workpiece and the desired radius of the circular cut. The operator thus has the ability to gradually advance the free end 39 of the pivot arm while at the same time rotating the workpiece (as indicated by arrow 51) to an extent sufficient to prevent binding of the blade as the blade spirals into the workpiece to ultimately reach the radius of the desired circle. The spiral cut is illustrated in FIG. 3, and bracketed at 54 to show the cutting tool spiraling down to the desired radius as defined by the condition under which the pivot arm 35 has engaged the stop means 46. It is at that position that the pivot arm 35 is locked and the operator is free to continue rotation of the workpiece as indicated by arrow 51a to continue the circular cut until completed. A full 360° circle can be cut or, if desired, the cut can be terminated after a partial arc is cut. In any event, the blade enters the workpiece along the segment 54, without the opportunity for binding or bowing, to cut into the workpiece, then having achieved the desired radius in a simple and reliable fashion, the device is fixed to complete the circular cut. There is no need to alter the inclination of the blade after the workpiece has entered the work, nor is there any need to precut the workpiece to the approximate size and shape of the desired circle, as is necessary with some fixtures. Nor is there any need to notch the workpiece to provide an entry point for the blade prior to the cut, since the configuration of pivot arm and support and the corresponding coordinated motion of the pivot arm and workpiece provides a trouble-free entry cut to the desired radius without danger of marring the workpiece.

For purposes of facilitating adjustment of the fixture for use with various tools, workpieces of various sizes, or for cutting circles of various sizes, adjustment means are provided for rapidly and reliably locating the important operational points with respect to each other and to the work tool. Thus, the base 30 is provided with a pair of slides 60, 61 adapted to engage slide ways 62, 63 formed in the base 30. The slide 60 is seen to carry the upstanding pivot pin 38 whereas the slide 63 carries the upstanding stop pin 46. Both slides include lock means, shown herein as thumb screws 64 engaging Tee-nuts 65 arranged in recesses in the lower surface of slides 60, 61. When the thumb screws 33 are rotated to the locked position, the Tee-nuts 65 project beyond the case of the associated slide to lock the slide securely in position in its way.

The pivot arm 35 has a central slide 66 adapted to ride in pivot arm way 67; lock means schematically illustrated as 68 secures the adjusted slide 66 in position in its associated way. The lock 68 is preferably a set screw engaging a Tee-nut (as illustrated in FIG. 4) to utilize a similar locking mechanism but with no projection above the surface of the pivot arm, so that a workpiece can smoothly ride over the slide 66 without interference. Set screws can obviously be used in place of the thumb screws in one or more locations in the base ways 60, 61 if desired.

Utilizing the adjustable ways as described above, it is possible to easily configure the fixture 21 for cutting a workpiece of any reasonable dimension to a circle of predetermined radius. The slide 60 is first adjusted so that the pivot point 38 is located in an approximate position which will cause the pivot arm to be approximately perpendicular to a line through the cutting tool and the center of the workpiece pivot Positioning the pivot point in that fashion will allow the blade to be substantially tangent to the workpiece during the normal cut. In some cases, when using fairly oversized workpieces, it may be desirable to move the pivot point 36 farther away from the cutting tool, but in most cases it will not be desirable to have the pivot point 36 any closer than that which will achieve the substantially 90° orientation as shown in FIG. 1. Following positioning of the slide 60, the slide 61 is similarly positioned for an approximate setup such that a working position of the pivot arm will be defined which is substantially normal to the line of the cutting tool as illustrated in FIG. 1. The final adjustment is achieved by means of adjusting slide 66 in slideway 67, and that is the adjustment which achieves the precise radius of cut. Thus, the slide 66 is positioned to precisely achieve the desired radius between the center point of pivot 42 and the cutting edge of the blade 22 so that when the working position is achieved as illustrated in FIG. 1, the circular piece remaining after rotation of the workpiece 42 through the cutting tool will be of the desired shape. It will be apparent to those skilled in the art that the thickness of the blade and the like must be taken into account in making the adjustment in order to achieve a final product of the desired size. Preferably, the adjustments are made with no workpiece in place so that the three working points are arranged with respect to each other and to the cutting tool, to achieve the desired final configuration. It will also be apparent that slight adjustments can be made in the various working points, so long as the final criteria, i.e., the dimension between the center of the pivot point 42 and the working edge of the cutting tool 22 achieve the desired radius. Although not illustrated in the drawings, scales can be provided with the ways to set up for nominal-sized workpieces, and deviations can be made from those scaled settings to fine tune a particular cut. In other cases, it may be desirable to simply mark positions on the ways in order to repeat cuts of a desired circle cut often.

Having thus adjusted the fixture 21 to produce a cut of a particular size, a workpiece is selected and a center hole drilled in the workpiece at a desired location. The center need not be in the precise center of the workpiece, but need be positioned sufficiently centrally of the workpiece to provide adequate material around the center point to produce the desired circle. The center should be drilled so that the workpiece fits closely on the center pin 42 and will not translate during rotation of the workpiece about the center point. After the workpiece is positioned as shown in FIG. 3, the operator, having turned on the power tool, begins to advance the free end 39 of the pivot arm toward the cutting tool while at the same time rotating the workpiece as previously described. It is found to be a rather natural motion, when using the left hand on the pivot arm and the right hand on the workpiece, to advance those elements to the working position without causing any substantial binding of the work tool, since if one hand advances too rapidly with respect to the other, the natural resistance of the tool entering the workpiece will signal the operator to either rotate the workpiece faster or advance the pivot arm slower. In any event, it will be found that using the fixture it is a relatively simple matter to rotate the workpiece and advance the pivot arm from the FIG. 3 to the FIG. 4 working position, following which the operator can release the pivot arm, since it has been locked in its fixed working position, and use both hands to rotate the workpiece 22 about the center point 42 and cut a perfect circle. Following cutting of the circle, the saw can be stopped and the elements removed, or alternatively, the saw can continue to run as the pivot arm is drawn back from the working position to cut the scrap at a second point and free the newly cut circle. If a number of circles of identical size are to be cut, the same settings of the fixture 21 can be used repeatedly to reliably produce circles in a relatively rapid fashion.

Figure 5:
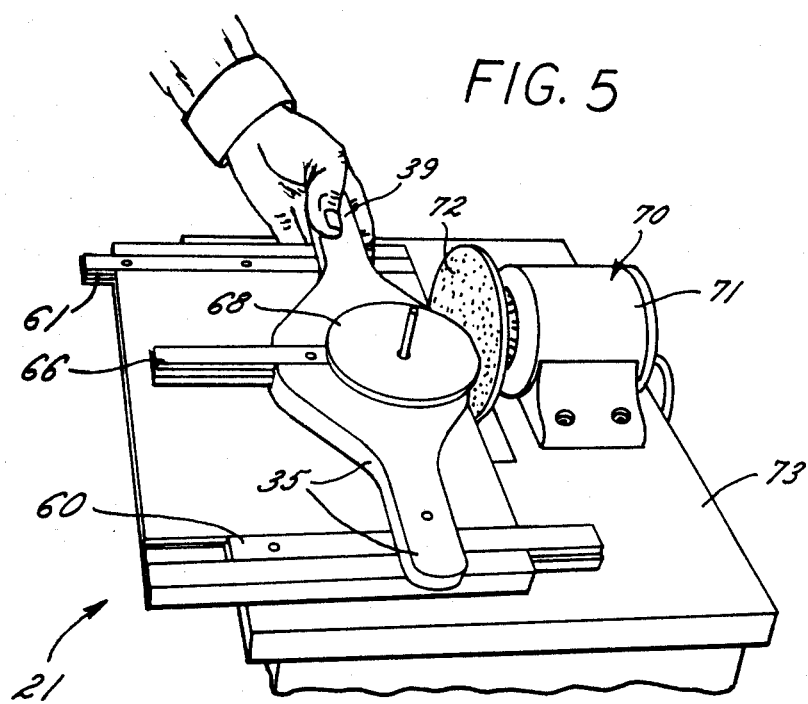
FIG. 5 is a diagram similar to FIG. 1 and showing a fixture according to the present invention adapted for use with a disc sander.

FIG. 5 illustrates the fixture 21 associated with an alternative cutting tool, in the illustrated embodiment a disc sander 70. It is seen that the disc sander has an electrical motor 71 during a sanding disc 72, and is supported on a work surface 73. The fixture 21 is also mounted on the work surface 73 in a fixed relationship with respect to the sanding disc 72. The base slides 60, 61 are positioned so that the pivot arm 35 is substantially normal to the plane of cutting of the sanding disc 72. The pivot arm slide 66 is positioned so that when the pivot arm 35 is in the working position (illustrated in FIG. 5) the working portion of the cutting disc 72 engages the workpiece 68 substantially tangentially to the circle being cut. It is thus a simple matter to advance the free end 39 (shown as being hand-held in FIG. 5) toward the working position (while the pivoted end 35 remains fixed), causing the workpiece 66 to engage the working portion of the cutting disc 72, following which continued rotation of the workpiece 66 serves to sand a circle of predetermined radius in the workpiece 66. Having illustrated the invention in connection with the jigsaw of FIG. 1 and the sander of FIG. 5, it will now be apparent that the fixture 21 is easily adaptable for use with cutters of various kinds including, in addition to those illustrated, belt sanders, band saws, and the like. Indeed, in some cases it may be desirable to cut a circle from rather thick material using a bench saw, so long as the fixture 21 can be mounted with respect to the circular blade of the bench saw to both bring the workpiece into the working position without substantial binding of the blade, then continue to present the blade to the workpiece substantially tangentially to the circle as the workpiece is rotated through its circle.

Figure 6:
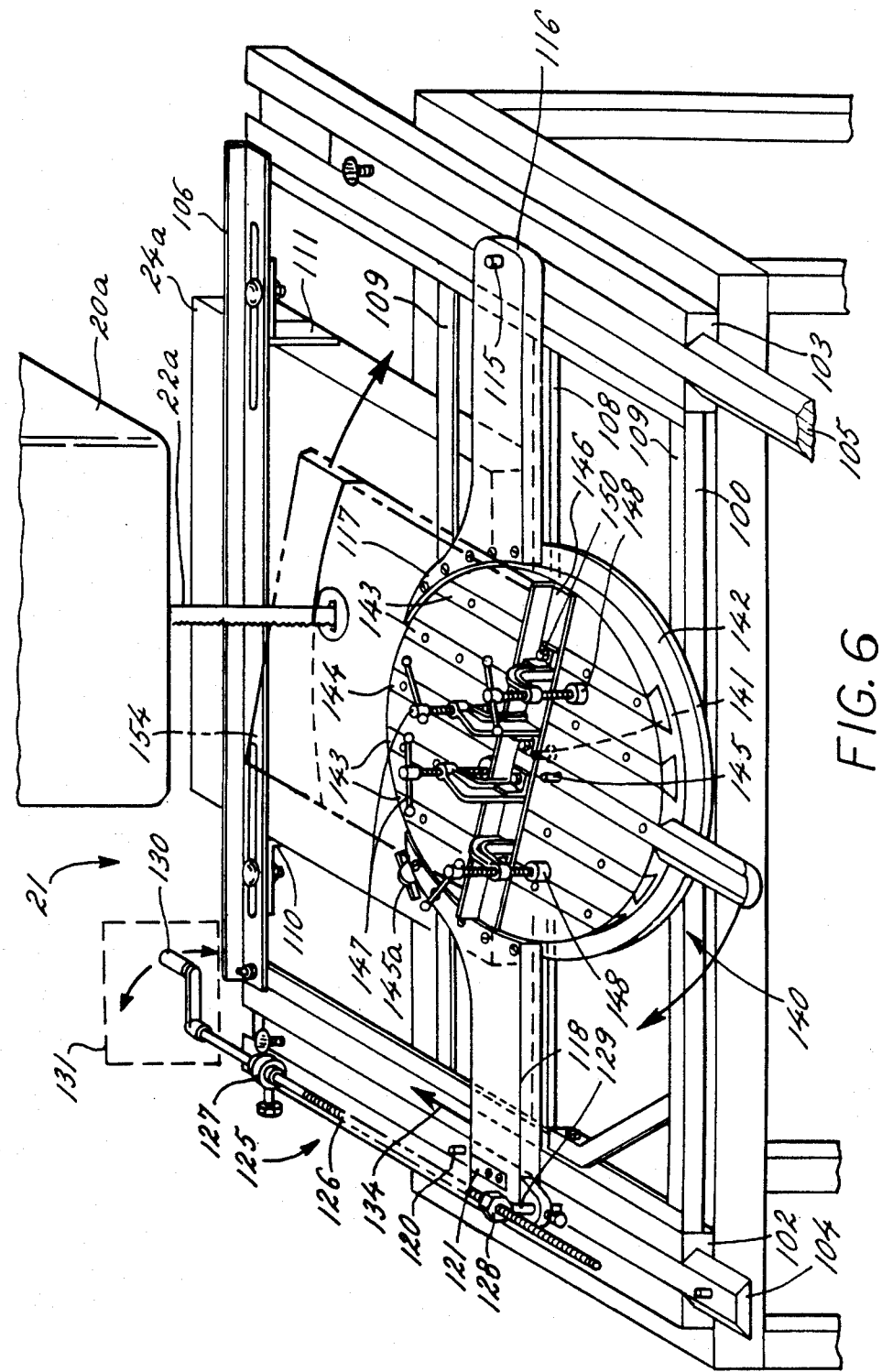
FIG. 6 is a perspective view showing a further embodiment of the invention utilized with a band saw and including drive means for controlling the position of the pivot arm with respect to the base.
Figure 7:
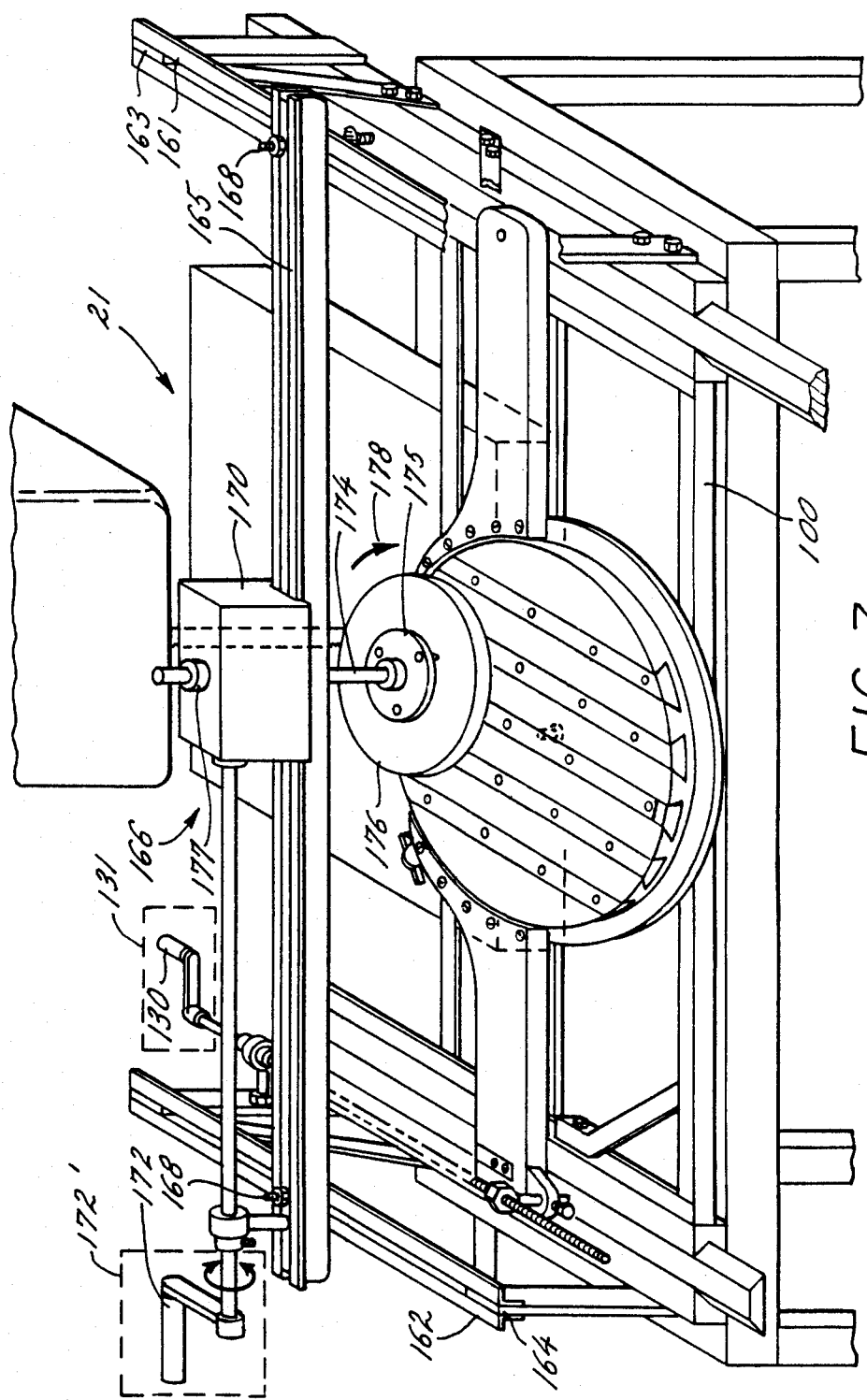
FIG. 7 is a view similar to FIG. 6 and additionally showing drive means for rotating the workpiece about its pivot point.

Turning now to FIGS. 6 and 7, there are shown auxiliary components adapted for use with the basic circle cutting apparatus described in detail above. As will be described below, such components provide for greater adaptability in the configuration of the workpiece which can be used, mechanized control of the fixture and workpiece movements, and power driven control of those elements.

Turning then to FIG. 6, there is shown an embodiment of a fixture 21 exemplifying the present invention for use in connection with a power tool schematically illustrated as band saw 20a having a cutting tool 22a driven by the motorized unit in the band saw. A base 24a is associated with the band saw and has mounted thereon the cutting fixture 21 of somewhat different configuration than that illustrated in FIG. 1. The configuration is the same in that the important elements such as the base, the pivot arm, the pivot arm pivot point, the pivot arm stop, and the workpiece pivot point are all provided, although in a somewhat different structural configuration than in FIG. 1. More particularly, the base 100 of the FIG. 6 embodiment is of open configuration having a pair of end members 102, 103 carrying slides 104, 105. Connecting structural brackets 106, 107, 108 and 109 join the end members 102, 103 to form a rigid rectangular structure. It is seen that the rearmost connecting bracket 106 has a pair of depending angle brackets 110, 111 adapted for adjustable engagement with the base 24a of the cutting tool. The intermediate brackets 107, 108 rest on the base of the cutting tool and can be clamped or otherwise fixed in position. In the illustrated embodiment, the forwardmost structural bracket 109 rides above the base. In a preferred form of the invention, the base 100 includes sets of legs, one at each side and one at the front, which are hinged at the base, and can be deployed downwardly (with adjustable legs to engage the floor to provide further support for the fixture). However, it will be clear that usually the power driven cutting tool itself is fixed with respect to the floor, and thus the legs can be of lighter configuration intended only to provide stability for the fixture.

As in the prior embodiment, a pivot arm pivot point 115 is provided, in the FIG. 6 embodiment being located on one of the slides 105, and adapted to locate the fixed end 116 of the pivot arm 117. The non-fixed or free end 118 of the pivot arm is thus free to move along the base 100 toward or away from the cutting tool 22a to control the position of the workpiece in the fixture. The pivot arm stop means including an upstanding pin 120 and releasable lock means 121 carried on the slide 104 and pivot arm 117, respectively, are also illustrated in FIG. 6.

In practicing this aspect of the invention, mechanized means are provided for controlling the advance of the pivot arm 117 toward the cutting tool 22a from the retracted to a working position. Such means are illustrated in FIG. 6 as a mechanical drive 125 including an elongated lead screw 126 supported in bearings 127 and adapted to engage a lead nut 128 secured by means of bracket 129 to the free end 118 of the pivot arm 117. Drive means are provided for the lead screw, shown in the FIG. 6 embodiment as a crank 130 adapted to rotate the lead screw. A schematically illustrated block 131 encompassing the crank 130 is intended to illustrate that a motorized drive can also be provided. It will thus be appreciated that rotating the drive means 130, 131 in the appropriate direction causes the lead screw 126 to draw the lead nut 128 in the direction indicated by arrow 134, pivoting the pivot arm 117 into the working position until the lock means 120, 121 engages to establish the radius for the final cut.

The FIG. 6 embodiment also illustrates a turntable generally indicated at 140 adapted to provide greater flexibility in mounting of the workpiece for presentation to the cutting tool. As is seen, the turntable 140 is mounted generally centrally of the pivot arm 117, and has a central pivot point 141 about which a circular rotatable turntable base 142 is mounted for rotation. It is seen that the turntable base has a plurality of slides associated therewith, end slides 143 being adapted for holding of a mounting bracket, and a center slide 144 being configured to carry a center pivot 145 about which the workpiece is intended to rotate during cutting of the circle. A clamping bracket 146 is adapted for engaging the slides 143 and is used as an alternative center fixation point when the workpieces are configured such that the center pivot point 145 is not to be used.

It is seen that the clamping bracket 146 includes a plurality of mechanical clamp devices 147, 148 affixed to a common channel 149. The channel in turn is mounted to the turntable by bolted connections 150 which engage selected ones of the slides 147. Thus, by virtue of the slides, the clamping device 146 can be secured in a variety of adjustable positions on the surface of the turntable. Two of the clamp mechanisms 147 are adapted for engaging the workpiece, and the other two clamp mechanisms 148 for engaging the surface of the turntable and providing a counterbalancing force to the clamp device. More particularly, a workpiece such as workpiece 154 is inserted over a portion of the turntable, and the clamps 147 tightened to force the workpiece against the surface of the turntable. The clamps 148 are also tightened to provide a counterbalancing force, keeping the bracket 146 from deflecting due to force exerted on the workpiece for securely clamping the workpiece 154 to the turntable. The arrangement employing the clamp mechanism 146 allows a rather large workpiece 154 to be manipulated, but one which does not necessarily reach the center point 145 of the turntable. Thus, arcs can be cut in a partial workpiece, even if the workpiece does not extend sufficiently inwardly to encounter the center, since the clamp mechanism 146 (and its associated slides 143) can be adjusted away from the center of the turntable to clamp the workpiece in position, while still allowing the turntable itself to rotate about its center 141 during the cutting operation. Thus, when the system is set up as illustrated in FIG. 6, the drive means 131 is operated to draw the pivot arm toward the working position while, at the same time rotating the turntable 142 about its center 141 to initially bring the workpiece into the tool to establish the predetermined radius. Continued operation then rotates the turntable, causing the tool to penetrate the workpiece at the predetermined radius to complete the circular (or arcuate) cut. It will be appreciated that when the workpiece is substantially truncated laterally as shown in FIG. 6, the task of causing the blade 22a t enter the workpiece is substantially simplified in that it is possible to simply rotate the turntable such that the workpiece is out of the area of the cutting tool, then engage the pivot arm drive to pivot the pivot arm to the working position, following which the workpiece is rotated to the blade at the appropriate radius to initiate and complete the cut. However, even when a full and very large workpiece is used on the turntable 142 of the FIG. 6 embodiment, the system can be operated to engage the blade 22a with the workpiece 154 at a distance substantially greater than the final desired radius, then to concurrently manipulate the pivot arm and the workpiece to pivot the pivot arm to the working position while rotating the workpiece by an amount adequate to prevent binding of the blade until the final working position is reached for the completed circular cut at the predetermined radius.

Turning to FIG. 7, there is shown a further alteration of the system of FIG. 6 in which the workpiece and turntable are the same as illustrated in FIG. 6, tut in which the fixture 21 further includes an upstanding superstructure generally indicated at 160 adapted to provide over-the-workpiece control. It will be apparent from the foregoing description that the invention provides an exceptional degree of freedom to work above the workpiece by virtue of the interrelationship between the base, the pivot arm, the pivot arm control mechanisms, and the workpiece pivot point. The FIG. 7 embodiment makes use of the over-the-workpiece access for providing a mechanical drive for rotating the workpiece. Such drive is illustrated in combination with the drive 131 for the pivot arm, thus providing a completely mechanized (or motor driven) system for cutting circles in workpieces.

In addition to the components described in FIG. 6, the system of FIG. 7 includes the upstanding superstructure 160 which includes a pair of end brackets 161, 162 providing channels 163, 164 adapted to support a cross brace 165 which carries a workpiece drive generally indicated at 166. The brackets 161, 162 are braced as needed in order to maintain a substantially vertical position with respect to the base 100. The cross brace 165 is preferably adapted for sliding engagement with the channels 162, 163 such that the drive means 166 can be precisely positioned over a center point of rotation for the workpiece. Once the cross brace 165 is thus positioned, lock means 168 can be secured to clamp the cross brace in position.

Carried on the cross brace 165 is the workpiece drive 166 comprising a gear box 170 and drive means illustrated in the form of manual crank 172, or block rectangle 172' intended to indicate a motorized drive. The drive 172 engages a right-angle drive within the gear box 170 which causes rotation of an output shaft 174 which is affixed to a hub or fitting 175 which engages the workpiece 176 for rotation about the center 145 which is carried on the center slide 144 of the turntable 142. The center pivot point 145 is hidden in FIG. 7, but it will be recalled from FIG. 6 that it is an upstanding pin on the center slide adapted for positioning to define the center about which the workpiece is to be rotated. It is noted that when the center slide 144 is adjusted to displace the pivot pin 145 from the center 141 of the turntable, a lock 145' can be engaged to prevent rotation of the turntable. In that condition, the workpiece is rotated about the center post 145 as in the FIG. 1 embodiment, and the turntable remains stationary. Upon positioning of the center pin and location of the workpiece over the center pin 145, the drive engaging flange 175 is then lowered to the workpiece (such as by releasing a clamp 177 on the shaft 174, allowing the hub 175 to securely engage the workpiece for rotation thereof. The clamp 177 is again locked, such that when the drive 172, 172′ is manipulated, the workpiece 176 rotates in the direction illustrated by arrow 178.

Thus, when using the system of FIG. 7, an operator first brings the pivot arm to a retracted position and locates a workpiece over the center port 145 of the center slide. This assumes, of course, that both the worktable slides and the turntable slides have been adjusted for the dimensions of the cut. The operator then engages the drive hub 175 with the workpiece, then either manually by manipulation of the cranks 130, 172, or automatically by engagement of motorized drive means 131, 172′, begins to pivot the pivot arm from the retracted position to the working position while at the same time rotating the workpiece 176. The speeds of motion are coordinated, either by control of the drive or by appropriate selection of drive ratios, to cause the blade to enter the workpiece without substantially binding, allowing continued advance of the pivot art toward the working position, with sufficient rotation of the workpiece to prevent binding, until the working position is reached, whereupon continued rotation of the workpiece causes the cutting of a circle at the preset radius.

Figure 8:
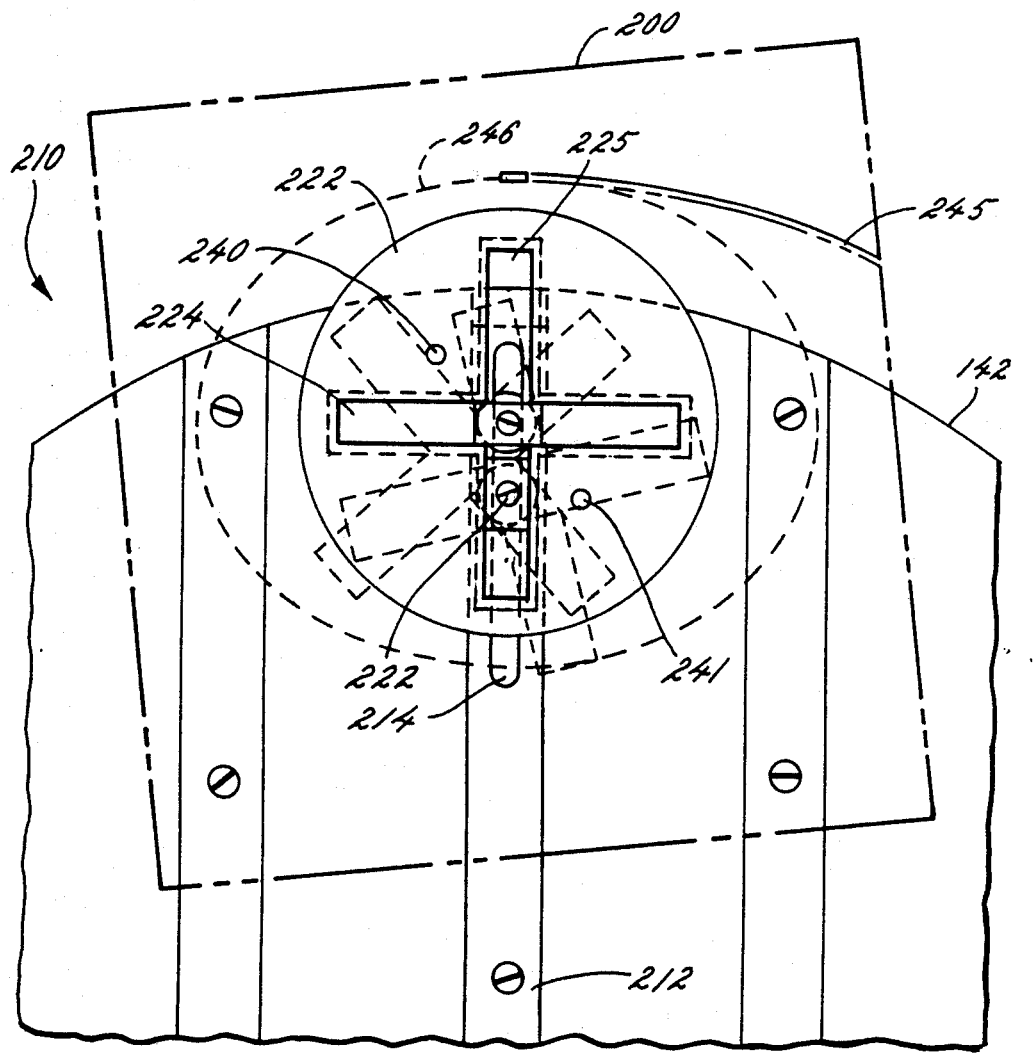
FIG. 8 is a diagram showing an attachment used in connection with the workpiece pivot point for causing the cutting tool to cut a predetermined elliptical curve.
Figure 9:
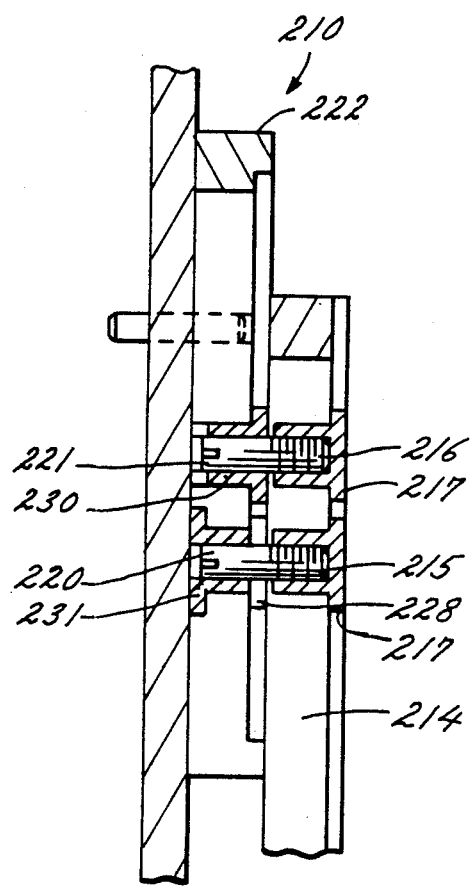
FIG. 9 is a view taken along the line 9—9 of FIG. 8 further illustrating the elliptical curve cutting attachment.

In some cases, it will be desired to cut curves of predetermined shape (and thus having predetermined axes) which are other than completely circular. FIGS. 8 and 9 illustrate an auxiliary element for use with the fixture 21 which is adapted to set the major and minor axes for an elliptical cut, then to control rotation of the workpiece as it engages the cutting tool to cause the cutting of an ellipse. More particularly, referring to FIG. 9, there is shown a workpiece 200 supported on a portion 142 of the center slide, the center slide in turn carrying an oval cutting adaptor generally indicated at 210.

In order to utilize the oval cutting adapter 210, a modified center slide 212 is provided having an elongate center slot 214 adapted to receive a pair of axis-establishing pivot members 215, 216 to define the major and minor axes of the ellipse to be cut. The pivot members 215, 216 are shown in FIG. 9 as secured as by Tee-nuts 217 in the slot 214 and having a pair of upstanding posts 220, 221 projecting into an oscillating workpiece holder 222 which carries the workpiece. The workpiece holder 222 has a pair of orthogonally arranged slots 224, 225 formed in the bottom thereof for engaging the upstanding pins 221, 222. It is seen in FIG. 9 that each of the slots has a surface section 226 which is slightly wider than an internal section 227. The surface section 226 is adapted to carry rollers 228 which are positioned on the pins 220, 221. Above the rollers are positioned a pair of sliding guides 230, 231 which retain the pins 220, 221 in the orthogonal slides 224, 225. As is well known for this type of mechanism, and as illustrated by dashed lines in FIG. 8, positioning of the pins 215, 216 in the slots establishes the major and minor axes of an elliptical path to be traversed by the work support 222 The rollers 228 which ride in the upper portions of the slots constrain the pins within the slots, while the slide members 227, 228 within the respective slots allow the fixture 210 to oscillate its work surface in such a way that any given point on the periphery thereof describes a perfect ellipse. A pair of locating pins 240, 241 are arranged on the upper surface of the work holder 222 for engagement with a workpiece 200. Thus, when the pins 221 are locked in their appropriate locations, and the center slide 212 positioned (with the pivot arm in the working position), the major and minor axes for the ellipse are defined. The pivot arm is then withdrawn and the workpiece installed. The pivot arm is then moved toward the working position (after the saw is activated) and the workpiece rotated as in the prior embodiments. However, as illustrated in the dashed line showing of FIG. 8, and by the blade path 245, the rotation of the workpiece 200 while the pivot arm is brought to the working position first causes the blade to traverse the scrap portion of the workpiece to enter the workpiece, then ultimately to define an ellipse 246 shown in dashed lines as the wheels and slides within the slots of the ellipse cutter restrain the rotation of the device to cause oscillation of the workpiece along the elliptical path, thereby causing the cutting of the curve illustrated at 246. Simply repositioning of the pins 215, 216 in the slot 214, or adjustment of the center slide 212 with respect to the tool will cause an alteration in the major or minor axes of the ellipse to form an ellipse having different axes. In any event, the illustration of FIGS. 8 and 9 demonstrates the adaptability of the present invention in cutting not only circles of a predetermined radius as described in detail above, but also curves having other defined axes such as the elliptical cut having major and minor axes illustrated in connection with the figures.

It will now be appreciated that what has been provided is a fixture for use with cutting tools of various configurations. When affixed to the work tool, the fixture provides a pair of points in a predetermined location with respect to the cutting tool, a pivot point for a pivot arm and a stop point to define a working position of the pivot arm. The pivot arm in turn carries a workpiece pivot point about which the workpiece is rotated during a cut. The pivot arm and workpiece are rotated concurrently as the work is brought into the cutting tool to allow the cutting tool to reach the predetermined axis for the circular (or elliptical) cut without binding of the tool or marring of the workpiece. Continued rotation of the workpiece after reaching of the working position then completes the cut in a safe, reliable and foolproof manner.

What is claimed is:

1. A fixture for use with a power driven cutting tool, for cutting a defined curve in a workpiece, the curve having at least one defined axis, the fixture comprising, in combination:

a base adapted to be positioned in a predetermined orientation with respect to the cutting tool, a pivot arm for supporting the workpiece for presentation to the cutting tool, first pivot means for mounting the pivot arm with respect to the base such that the pivot arm is pivotable toward the cutting tool in an arc centered at the first pivot point, a second pivot point on the pivot arm for providing rotation of the workpiece about the second pivot point, and stop means for defining a working position of the pivot arm in which the workpiece and the cutting tool are displaced by a distance corresponding to said axis sc, that the cutting tool is positioned to cut said defined curve upon rotation of the workpiece.

2. The combination as set forth in claim 1 wherein the axis is a radius defining said predetermined curve as a circle, the positional relationship between the cutting tool and second pivot point being defined by the radius when the pivot arm is in the working position.

3. The combination as set forth in claim 1 wherein the defined curve is an ellipse having two axes comprising major and minor axes, the second pivot point including means for defining the major and the minor axes for displacing while pivoting the workpiece during rotation so that the cutting tool defines the ellipse.

4. The combination as set forth in claim 1 wherein the base further includes base slide means for relatively positioning the first pivot point and the stop means with respect to the cutting tool.

5. The combination as set forth in claim 4 wherein the pivot arm further includes pivot arm slide means for relatively positioning the second pivot point with respect to the cutting tool.

6. The combination as set forth in claim 4 further including a turntable mounted on the pivot arm, the turntable being circular and having a center on the pivot arm and bearing means for allowing the turntable to rotate on the pivot arm, the turntable having turntable slide means carrying the second pivot point, the turntable slide means being adjustable to position the second pivot point at the center of the turntable so that a workpiece mounted on the second pivot point is supported on the turntable for rotation in engagement with the cutting tool.

7. The combination as set forth in claim 6 in which the turntable slide means is adapted to displace the second pivot point from the center of the turntable, and further including lock means for the turntable for locking the rotational position of the turntable and allowing the workpiece to pivot around the displaced second pivot point.

8. The combination as set forth in claim 6 further including clamp means affixable to the turntable, the clamp means being so adapted and arranged as to clamp a workpiece to the turntable for pivoting about the center thereof.

9. The combination as set forth in claim 8 wherein the clamp means is positionable to clamp a truncated workpiece to the turntable even when the workpiece does not overlie the turntable center.

10. The combination as set forth in claim 5 further including pivot arm drive means for controllably driving the pivot arm toward the stop means.

11. The combination as set forth in claim 10 wherein the pivot arm drive means further includes a motorized drive for smoothly driving the pivot arm from a retracted position to the stop means.

12. The combination as set forth in claim 5 further including a workpiece drive for rotating the workpiece about the second pivot point.

13. The combination as set forth in claim 12 wherein the workpiece drive further includes a drive motor for smoothly rotating the workpiece about the workpiece drive.

14. The combination as set forth in claim 13 further including a pivot arm drive including a drive motor for driving the pivot arm from a retracted position to the stop means, and means for coordinating the pivot arm drive and the workpiece drive for advancing the workpiece into the cutting tool to the working position without substantial binding of the cutting tool.

15. The combination as set forth in claim 5 wherein the pivot points and the stop means are oriented with respect to each other and positionable with respect to the cutting tool such that the cutting tool penetrates the workpiece in a substantially nonbinding manner as the pivot arm and workpiece are rotated to the working position.

16. A fixture for use with a power driven cutting tool for cutting a circle of predetermined radius in a workpiece, the fixture comprising, in combination:
a base including means for fixedly mounting the base with respect to the power driven cutting tool, the base including a pair of guide ways,
a pivot arm for supporting the workpiece for presentation to the cutting tool,
a first slide engageable in one of the base ways and carrying a pivot arm pivot point for engagement with a fixed end of the pivot arm,
a second slide engageable in the other base way and carrying stop means engageable with the pivoted non-fixed end of the pivot arm for establishing a working position of the pivot arm, and
the relative positions of the first, second and pivot arm slides being adjustable to allow the pivot arm and workpiece to be rotated to the working position while the cutting tool engages the workpiece in a nonbinding fashion to bring the cutting tool into the working position for cutting a circle of the predetermined radius from the workpiece.

17. The combination as set forth in claim 16 further including pivot arm drive means for controlling the movement of the pivot arm toward the working position, and workpiece drive means for rotating the workpiece about the second pivot point.

18. The combination as set forth in claim 17 further including a turntable mounted for rotation on the pivot arm about a turntable center point, the turntable including turntable slide means for carrying the second pivot point, the turntable slide means being positionable to locate the second pivot point over the turntable center point so that rotation of the turntable causes rotation of the workpiece for engagement with the cutting tool, the turntable slide means being displaceable such that the second pivot point is displaced from the turntable center point thereby to allow rotation of the workpiece about the second pivot point while the turntable is fixed.

19. A method of cutting a defined curve in a workpiece, the curve having at least one defined axis, the method comprising the steps of:
providing a supporting base having a fixed relationship with respect to a cutting tool,
supporting a workpiece on a pivot arm mounted on the base at a first pivot point such that the pivot arm with workpiece is pivotable toward the cutting tool,
mounting a workpiece on the pivot arm at a second pivot point such that the workpiece is rotatable about the second pivot point,
engaging the workpiece with the cutting tool by pivoting the pivot arm toward a working position in which the cutting tool engages the workpiece,
rotating the workpiece about the second pivot point while pivoting the pivot arm toward the cutting tool to an extent sufficient to prevent binding of the cutting tool, and
rotating the workpiece about the second pivot point with the pivot arm in the working position to cause the cutting tool to cut the defined curve.

* * * * *